United States Patent
Clarkson et al.

(10) Patent No.: US 6,631,267 B1
(45) Date of Patent: Oct. 7, 2003

(54) ROAD-BASED EVALUATION AND INTERPOLATION OF WIRELESS NETWORK PARAMETERS

(75) Inventors: Kenneth L. Clarkson, Madison, NJ (US); Karl Georg Hampel, New York, NY (US); John D. Hobby, Piscataway, NJ (US); Paul Anthony Polakos, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/434,580

(22) Filed: Nov. 4, 1999

(51) Int. Cl.$^7$ .................................................. H04Q 7/20
(52) U.S. Cl. ..................... 455/446; 455/67.1; 455/67.7; 455/423; 455/424; 455/425; 455/67.3; 370/397; 340/934; 340/905
(58) Field of Search .............................. 455/446, 67.1, 455/67.3, 423–425, 67.7; 370/397; 340/934, 905

(56) References Cited

U.S. PATENT DOCUMENTS

| | | | |
|---|---|---|---|
| 5,270,919 A | * 12/1993 | Blake et al. | 370/400 |
| 5,293,640 A | * 3/1994 | Gunmar et al. | 455/446 |
| 5,465,390 A | 11/1995 | Cohen | |
| 5,491,644 A | * 2/1996 | Pickering et al. | 709/226 |
| 5,689,812 A | * 11/1997 | Takahashi | 455/67.6 |
| 5,710,758 A | 1/1998 | Soliman et al. | |
| 5,963,867 A | * 10/1999 | Reynolds et al. | 455/457 |
| 6,069,894 A | * 5/2000 | Holender et al. | 370/397 |
| 6,308,071 B1 | * 10/2001 | Kalev | 455/446 |
| 6,356,758 B1 | * 3/2002 | Almeida et al. | 455/446 |
| 6,421,435 B1 | * 7/2002 | Bastien et al. | 379/133 |

FOREIGN PATENT DOCUMENTS

| WO | WO 93/15591 | 8/1993 |
|---|---|---|
| WO | WO 94/03986 | 2/1994 |

OTHER PUBLICATIONS

Planet Tool, Mobile Systems International, http://www.rmrdesign.com/msi, 1999.
Asset Tool, Aircom, http://www.aircom.co.uk, 1999.
H. Hoppe, "View–Dependent Refinement of Progressive Meshes," in Computer Graphics Proceedings, pp. 189–198, 1997.
H. Hoppe, "Progressive Simplicial Complexes," in Computer Graphics Proceedings, pp. 217–224, 1997.
J. Sklansky et al., "Fast Polygonal Approximation of Digitized Curves," Pattern Recognition, 12(5):327–331, 1980.
K. Tutschku et al., "Spatial Traffic Estimation and Characterization for Mobile Communication Network Design," IEEE Journal on Selected Areas in Communications, vol. 16, No. 5, pp. 804–811, Jun. 1998.

* cited by examiner

Primary Examiner—Dwayne Bost
Assistant Examiner—Sujatha Sharma

(57) ABSTRACT

Techniques for determination of network parameters in, e.g., a processor-implemented system for characterizing, adjusting or optimizing the performance of a wireless network. In an illustrative embodiment, values of one or more link parameters of the wireless network are interpolated along edges in a mesh of data points derived at least in part from road location data characterizing an area serviced by the wireless network. A measure of network performance, e.g., a coverage measure based on pilot signal-to-interference ratio, may be generated using the interpolated values. The edges of the mesh have associated therewith a set of edge weights representative of traffic in the wireless network. The edge weights may be adjusted so as to be in agreement with available network traffic data. Interpolating between the data points of the road-based mesh permits the network performance measure to be computed as a smooth, differentiable function of the one or more link parameters, thereby simplifying network characterization, adjustment and optimization.

30 Claims, 3 Drawing Sheets

ROAD-BASED EVALUATION AND INTERPOLATION OF WIRELESS NETWORK PARAMETERS

RELATED APPLICATIONS

The present invention is related to the inventions described in the U.S. patent applications of K. L. Clarkson et al. Ser. No. 09/434,579 entitled "Methods and Apparatus for Characterization, Adjustment and Optimization of Wireless Networks," and Ser. No. 09/434,578 entitled "Methods and Apparatus for Derivative-Based Optimization of Wireless Network Performance," both filed concurrently herewith and incorporated by reference herein.

FIELD OF THE INVENTION

The present invention relates generally to wireless communication networks, and more particularly to techniques for obtaining and processing network parameter information in the design, implementation and/or operation of such wireless networks.

BACKGROUND OF THE INVENTION

A typical wireless network includes a multitude of interconnected base stations providing wireless traffic to a varying number of fixed or mobile users distributed over a geographically well-defined coverage area. The wireless interface generally has to operate under conditions including demand for multiple access to the network, uncontrollable signal propagation, and a limited bandwidth. The demand for multiple access to the network means that location and time of service requests are not known a priori. Therefore, the network has to provide the required level of service with sufficient capacity over a large geographical area. The above-noted uncontrollable signal propagation condition indicates that a wireless link between a base station and a user relies on signal propagation in an environment that is typically associated with high propagation loss, and reflection, diffraction, or scattering effects at clutter, terrain, and other types of obstacles.

These propagation effects further lead to interference among wireless communication channels. The interference increases with the amount of traffic carried by the network, and can result in reduced quality of service, service interruption, or service discontinuation, e.g. dropped calls. This is highly undesirable and sets an upper limit to the traffic than can be carried by the network. These limitations strongly depend on-the local propagation environment, the network layout and configuration, and the spatial traffic distribution.

In order to obtain the best performance from a wireless network in terms of quality of service and amount of traffic that can be carried, network modeling tools are often utilized. Such network modeling tools include, e.g., commercially available tools such as the Planet tool from Mobile Systems International, http;//www.rmrdesign.com/msi, and the Asset tool, which is a network design tool that includes a frequency-planning algorithm, from Aircom, www.aircom.co.uk. These tools usually calculate the spatial distribution of a Radio Frequency (RF) link metric, e.g. RF field strength, or a measure of service quality, e.g. frame error rate, using a propagation-prediction algorithm and data about the network configuration, the traffic load, the terrain, and the communications-standard-specific link-budget parameters. Based on the results, the network configuration can be tuned. This approach can address a full variety of network parameters, such as, e.g., number of cells, number of communication channels per cell, antenna locations, pattern, tilt, orientation, transmit power level per communication channel and cell, frequency plan, handoff thresholds, etc. Conventional network modeling tools may be used in a design stage, when a network is upgraded, or when a network has to be readjusted to respond to changes in environment or traffic pattern.

Besides providing information about the spatial distribution of link performance, it is of value to predict an overall network performance measure as, e.g., network coverage or overall network blocking rate. Such measures help to quantify the overall performance of a network in absolute terms and improvements made when the network configuration is changed. Defining and predicting such overall network-performance measures is also necessary if optimization algorithms are used to improve a network.

The above-noted conventional network modeling tools suffer from a number of significant drawbacks. For example, their accuracy in predicting local link performance is limited by the finite resolution of terrain and clutter data and the coarse approximations of the propagation prediction algorithm. In addition, these conventional network modeling tools are typically very unreliable in predicting overall network measures, and therefore generally cannot be used as the basis for mathematical or numerical optimization processes. This is due to the fact that the prediction of a network performance measure such as network coverage can produce reliable results only if the local traffic distribution is captured in the modeling process. For example, areas with high traffic should have more weight in the network coverage analysis that those with little or no traffic.

Similar problems arise in using the conventional tools to predict a measure of network capacity or network blocking rate. For example, interference generated by a traffic hotspot highly depends on its exact location. This issue becomes even more important in modern networks which include power control features. Small local variations in traffic distribution may lead to strong variations in the associated propagation loss. This results in incorrect power level estimations of the involved communication channels, which impacts the prediction of interference and power budget, both reflected in the effective network capacity.

Another problem is that conventional network modeling tools usually analyze a local link-performance parameter over a regular topological grid. Since such a grid does not reflect the actually existing traffic pattern, these tools fall short in providing a representative picture of overall network performance measures. Further, the discrete nature of the grid does not allow a mathematically solid definition for derivatives which is necessary if such tools are to be used as the basis for a derivative-based optimization procedure. Although numerical methods can be used instead, such methods generally require a very fine grid spacing, leading to unacceptably long processing times.

It is therefore apparent that a need exists for improved techniques for evaluation and interpolation of network parameters, for use in modeling of wireless networks, so as to overcome the above-described problems of the conventional techniques.

SUMMARY OF THE INVENTION

The present invention provides improved techniques for evaluation and/or interpolation of network parameters for use in modeling wireless networks, and may be implemented in, e.g., a processor-based system for characterizing, adjusting or optimizing the overall performance of a wireless network. In an illustrative embodiment, values of one or more link parameters of the wireless network are evaluated over test points that are derived at least in part from road location data, e.g., road maps, characterizing an area serviced by the wireless network. The evaluation may be performed using a link model. In another embodiment, values of one or more link parameters of the wireless network are interpolated along a plurality of edges between data points defining a mesh, wherein the edges correspond to roads. A measure of network performance is then generated using the interpolated values. The edges of the mesh have associated therewith a set of edge weights representative of traffic in the wireless network. The edge weights may be adjusted so as to be in agreement with available network traffic data. The mesh may be generated from, e.g., a road map file or an image file, and mesh simplification operations such as edge collapsing may be applied thereto prior to interpolation.

Examples of link parameters that may be interpolated along the edges of the mesh include the signal level of a communication channel, the signal-to-interference ratio of a communication channel, and the path loss between a network user and a base station. The network performance measure may be, e.g., a network coverage measure, such as a fraction of a target coverage area having access to a base station pilot signal at a signal-to-interference ratio above a specified threshold.

Advantageously, interpolating between the data points of a road-based mesh in accordance with the invention averages out statistical variations and permits the network performance measure to be computed as a smooth, differentiable function of the one or more link parameters, thereby simplifying network characterization, adjustment and optimization. Furthermore, the road-based interpolation of the present invention can give substantially better results in wireless network design, adjustment and optimization than the above-noted conventional topological grid.

The present invention may be implemented in one or more software programs running on a personal computer, workstation, microcomputer, mainframe computer or any other type of processor-based information processing device. These and other features and advantages of the present invention will become more apparent from the accompanying drawings and the following detailed description.

DETAILED DESCRIPTION OF THE INVENTION

The present invention will be illustrated below in conjunction with exemplary wireless network information processing techniques implemented in a computer-based processing system. It should be understood, however, that the invention is not limited to use with any particular type of processing system. The disclosed techniques are suitable for use with a wide variety of other systems and in numerous alternative applications. Moreover, the described techniques are applicable to many different types of wireless networks, including time division multiple access (TDMA), frequency division multiple access (FDMA) and code division multiple access (CDMA) wireless networks, with mobile subscriber units, fixed subscriber units or combinations of mobile and fixed units. The term "wireless network" as used herein is intended to include these and other types of networks, as well as sub-networks or other portions of such networks and combinations of multiple networks. The term "mesh" as used herein is intended to include any arrangement of at least partially interconnected data points. The terms "optimize," "optimizing" and "optimization" as used herein should be understood to include any type of improvement in network performance, e.g., an improvement which provides performance deemed to be acceptable for a given application. These terms as used herein therefore do not require any type of true optimum, such as an actual minimum or maximum of a particular performance function.

An illustrative embodiment of the present invention is directed to a processor-implemented method and apparatus for road-based evaluation and/or interpolation of network parameters.

Figure 1:
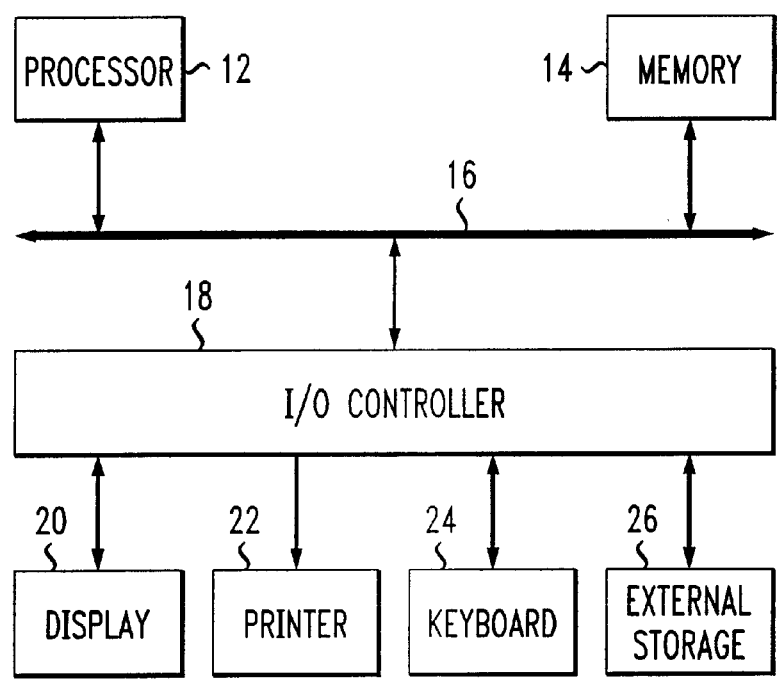
FIG. 1 is a block diagram of a processing system in which a road-based evaluation and/or interpolation process may be implemented in accordance with the invention.

FIG. 1 shows an exemplary processing system 10 in which road-based evaluation and/or interpolation techniques in accordance with the present invention may be implemented. The processing system 10 includes a processor 12 and a memory 14, connected to communicate via a bus 16. The system 10 further includes an input/output (I/O) controller 18 which is connected to the bus 16 in order to communicate with the processor 12 and memory 14. The I/O controller 18 in conjunction with the processor 12 directs the operation of a number of peripheral components including a display 20, a printer 22, a keyboard 24 and an external storage device 26.

One or more of the elements of system 10 may represent portions of a desktop or portable personal computer, a workstation, a microcomputer, a mainframe computer, or other type of processor-based information processing device. The memory 14 and external storage device 26 may be electronic, magnetic or optical storage devices. The external storage device 26 may include a database of wireless network information, e.g., a database of information on wireless network operating parameters, etc. that is utilized to generate graphical displays that will be described below. The external storage device 26 may be a single device, or may be distributed, e.g., distributed across multiple computers or similar devices. The term "database" as used herein is intended to include any arrangement of stored data that may be used in conjunction with a road-based interpolation technique.

The present invention may be implemented at least in part in the form of a computer software program stored in memory 14 or external storage 26. Such a program may be executed by processor 12 in accordance with user-supplied input data to produce a desired output in a predetermined format, e.g., on display 20 or on a print-out generated by printer 22. The user-supplied input data may be entered at the keyboard 24, read from one or more files of external storage device 26, or obtained over a network connection from a server or other information source.

As noted above, overall performance metrics for wireless networks, such as network coverage and network capacity, can be estimated by using statistical propagation models to compute RF link properties over a topological grid. However, the present invention provides significantly improved results using an irregular mesh based on a road map. Road maps give valuable information about how traffic might be distributed. Taking RF link metrics such as estimated power received and carefully interpolating along the roads in the irregular mesh averages out statistical variations and allows network performance to be described as a smooth function of basic network parameters.

1. Exemplary Modeling Procedure

An exemplary procedure will now be described that illustrates how road-based traffic evaluation and interpolation in accordance with the invention can be implemented.

1.1 Modeling of Network Parameters

A wide variety of network parameters may be associated with modeling the performance of a wireless network. Network parameters that define the configuration of a network generally have to be predetermined in the modeling process. Such parameters can be, e.g., hardware-, terrain-, clutter-, or traffic-related, or can be specific to a particular communications standard. Examples of such configuration parameters include cell location, antenna parameters, power levels, handoff thresholds, channel bandwidth, terrain elevation data, etc. Among the network configuration parameters, some can be considered fixed network parameters, such as, e.g., terrain elevation data, possibly antenna location, or antenna height, while others can be considered tunable network parameters, such as, e.g., antenna tilt, power level per communication channel, frequency plan, etc.

If a wireless network is to be optimized using an optimization algorithm, the network parameter that is changed in the optimization process is advantageously considered the tunable network parameter. For example, when a frequency-planning algorithm is used, this tunable network parameter can be the network frequency per channel unit in each cell. As another example, if a derivative-based optimization algorithm is used, this tunable network parameter can be antenna tilt, power lever per communication channel, or any other mathematically continuous network configuration parameter. A commercially available tool that includes a frequency-planning algorithm is the above-noted Asset network design tool from Aircom, www.aircom.co.uk. Examples of derivative-based algorithms are described in the above-cited U.S. Patent Application of K. L. Clarkson et al. entitled "Methods and Apparatus for Derivative-Based Optimization of Wireless Network Performance."

Apart from the configuration parameters, there are network parameters that are determined within the modeling process. These parameters are usually link-related parameters such as, e.g., path loss, cell assignment, field strength measures at a certain location, other local link-performance metrics and overall network performance measures. These parameters provide information about the performance of the network. An example of a network design tool that models link-performance metrics of a wireless network is the above-noted Planet tool from Mobile Systems International, http://www.rmrdesign.com/msi. An example of a path loss model on which tools such as Planet are based is the well-known Hata model, described in M. Hata, "Empirical formula for propagation loss in land mobile radio services," IEEE Trans. on Vehicular Technology, VT-29:317–325, August 1980.

In the CDMA IS-95 standard, for instance, forward-link pilot coverage is a significant factor for link performance. At a given test point i, forward-link coverage can be estimated from the dominant-server signal-to-interference ratio:

$$\max_{1 \leq k \leq n} \left( \frac{Etot_{ik}}{fm_i \eta - \alpha_k Etot_{ik} + \sum_{j=1}^{n} \beta_j Etot_{ij}} \right), \quad (1)$$

where n is the number of sectors, $\alpha_k$ and $\beta_j$ are constants derived from network parameters, $Etot_{ij}$ is the power received from antenna j at test point i, $\eta$ is an overall noise term, and $fm_i$ may represent an additional fade margin. Test point i is covered if (1) is above an appropriate threshold $Y_0$.

Based on such a definition of coverage at one test point i, network coverage can be defined as the fraction of all test points that have forward-link pilot coverage. The individual test points can carry different weights, representing, e.g., the importance of a particular location or the traffic density. Since this network coverage measure has one value for each network configuration, it allows one to compare the performance of various network configurations. This in turn allows one to find the "best" network configuration, or to use an optimization algorithm that maximizes this network performance value.

1.2 Traffic Modeling

The quality of a network-performance measure gained from such a modeling process strongly depends on the choice and distribution of test points. If test points are distributed on a regular grid, the obtained plot of covered or uncovered areas will not reflect network performance under operation, since uncovered test points may lie in low traffic areas. A network coverage measure based on these test points will therefore be almost meaningless.

If the goal is to adjust network parameters with a derivative-based algorithm so as to maximize the network coverage or some other measure of overall network performance, it is important for the function to vary in a smooth manner as the network tuning parameter, e.g., antenna tilt, is adjusted. This is because sophisticated optimization algorithms require the function to have well-defined first derivatives and sometimes second derivatives. Without meaningful derivatives, one has to resort to direct search methods as described in, e.g., Margaret H. Wright, "Direct search methods: Once scorned, now respectable," in D. F. Griffiths and G. A. Watson, eds., Numerical Analysis 1995 (Proceedings of the 1995 Dundee Biennial Conference in Numerical Analysis), pp. 191–208, Addison Wesley Longman, Harlow, United Kingdom, 1995. These direct search methods can have very poor convergence properties, particularly when the dimensionality is high. In the common case where there is at least one independent variable per sector, the dimensionality is often greater than 100.

In order for overall performance measures such as coverage to be differentiable functions of network parameters such as antenna tilts, it is preferable that the traffic distribution be approximated by something other than just a set of discrete points. A possible alternative approach is to add connecting lines between the above-noted test points to form a mesh, and then assign traffic densities to each connecting line and integrate over these connecting lines. For example, one could measure coverage by evaluating (1) at each end of each connecting line and then interpolating the resulting values along the connecting lines and deciding what fraction of each line has an interpolated (1) value above the $Y_0$ threshold.

It should be noted that one could also use the mesh to describe the domain as a non-overlapping set of triangles or quadrilaterals and then use the values of (1) at the corners of each such triangle or quadrilateral to decide what fraction of the triangle or quadrilateral is covered. However, such a technique has a number of significant drawbacks. For example, it is not really necessary in order to achieve the differentiability needed for optimization, it complicates the interpolation conditions, and it is not compatible with real-world traffic.

Therefore, the definition of the best set of test points should be based on knowledge about the real-world traffic distribution. Road maps are an important source of data about the spatial distribution of wireless traffic since, e.g., many mobile calls do take place on or near reads, and areas of high population density tend to have many roads. Another benefit of road maps is that they usually distinguish between small roads and various types of major roads. Hence, an illustrative embodiment of the present invention uses road maps to provide the fine details about how traffic is distributed with the understanding that the weights in the resulting mesh should be adjusted to agree with observed measurements such as traffic per base station sector.

The remainder of the description is organized as follows. Section 2 describes the conversion of road location data into an appropriately-weighted network of connecting lines between test points, Section 3 describes how to interpolate RF link metrics along the edges in such a mesh, and Section 4 describes sample meshes and shows that such meshes produce relatively smooth functions for network parameters such as the coverage fraction.

2. Road Map Data

An example of a set of publicly-available road map data for the United States (including Puerto Rico and Island Territories) is the U.S. Census Bureau Tiger database, described in TIGER/LINE 1997 Census Files, Technical Report, Bureau of the Census, U.S. Dept. of Commerce, Washington, D.C., http://www.census.gov/geo/tiger/TIGER95D.pdf. In addition to roads, it covers features such as rivers, railroads, political boundaries, and certain types of buildings. The roads are given as polygonal lines identified by names and categories such as "divided highway," "secondary road," "local road," etc. When two roads intersect, the two polygonal lines are guaranteed to intersect exactly at a vertex.

In accordance with the invention, this exemplary set of road map data may be used to define an edge-weighted graph. Simply assign each polygonal line segment a weight based on its length and the above categories, and use a hash table to match up the common vertices where polygonal lines intersect. The result can be stored as an edge-weighted graph with adjacency lists for the edges and latitude, longitude pairs for the vertices. Examples of such edge-weighted graphs will be described in conjunction with FIGS. 7 and 8 below.

Map data can sometimes also be obtained in vector-based graphics formats such as DXF, as described in AutoCAD 2000 DXF reference, http://www.autodesk.com/techpubs/autocad/dxf, 1999. Converting such data into an edge-weighted graph is similar to processing the above-noted Tiger database data except for a different input syntax and a possible need for manual intervention if there are different types of roads on different DXF "layers." Since these layer names are not standardized, one must choose edge weight multipliers for each layer.

2.1 Finding Roads in an Image

If a map is available only as an image file, converting it into an edge-weighted graph generally requires vectorization, as described in, e.g., David S. Doermann, "An introduction to vectorization and segmentation," in GREG'97 Proc. of 2nd IAPR Workshop on Graphics Recognition, pp. 1–7, 1997. Assume that an automatic or semi-automatic technique is available for deciding which pixels in the image depict roads, e.g., by selecting all pixels of a certain color. This leaves the task of finding a vector description for a black-and-white image. The basic idea is to find a "skeleton" and then compute a polygonal approximation that smooths out the pixel quantization noise.

Figure 2:
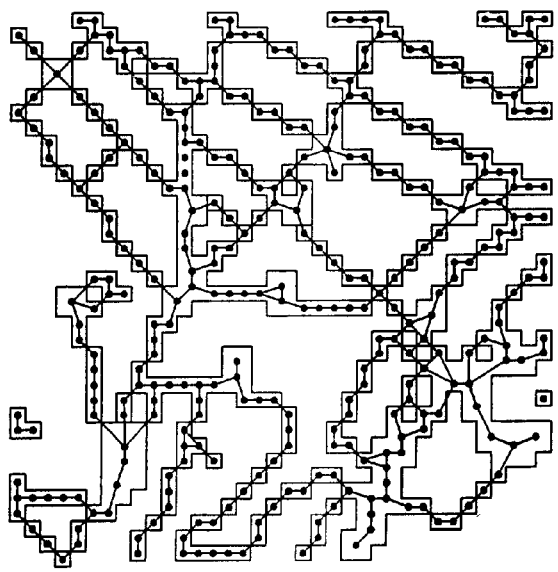
FIG. 2 shows a portion of a road map image that may be used in a road-based evaluation and/or interpolation process in accordance with the invention.

FIG. 2 shows by way of example a portion of a road map image with its polygonal skeleton determined using the Wakayama algorithm described in Tadao Wakayama, "A core-line tracing algorithm based on maximal square moving," IEEE Transactions on Pattern Analysis and Machine Intelligence, 4(1):68–74, January 1982. In the figure, the polygonal skeleton is marked by black dots and white lines. The noise that needs to be smoothed out gives the white lines their jagged appearance, and is attributable to the manner in which the locations of the black dots are influenced by the pixel grid.

The vertices of the skeleton graph, i.e., the black dots in the figure, are scanned to identify all the vertices of degree more than two. The polygonal lines that start and stop at such vertices may then be input to a polygonal approximation algorithm such as that described in J. Sklansky and V. Gonzalez, "Fast polygonal approximation of digitized contours," Pattern Recognition, 12(5):327–331, 1980. This produces a network of polygonal lines where each line segment is associated with a specific portion of the skeleton. Edge weights can be obtained by counting the pixels associated with each line segment. An advantage of the above-noted Wakayama algorithm is that it produces a skeleton for which it is relatively easy to count the image pixels associated with particular parts of the skeleton. The results may be improved by refinements such as filling in drop-out pixels, i.e., non-road pixels surrounded by road pixels, before finding the skeleton or removing short side chains after finding the skeleton.

2.2 Adding Edges

If a map image is not available, a possible alternative approach is to distribute test points pseudo-randomly with probabilities based on whatever information is available. For example, if only elevation data is available, one might assume that valleys are more heavily-populated than mountain tops.

Pseudo-randomly generated test points generally require an algorithm for selecting connecting lines, such as the Delaunay triangulation algorithm described in, e.g., S. J. Fortune, "Voronoi diagrams and Delaunay triangulations," in F. K. Hwang and D.-Z. Du, eds., Computing in Euclidean Geometry, pp. 193–233, World Scientific, 1992. Although this algorithm is acceptable, it may preferable to use a simpler algorithm that looks for connecting lines that are roughly vertical and horizontal as one might find in a road map.

An example of such an algorithm is as follows. First divide vectors (x,y) into four quadrants based on the signs of x+y and x−y. Then for each quadrant and each test point $(x_i, y_i)$, connect it to the test point $(x_j, y_j)$ such that $(x_j-x_i, y_j-y_i)$ is in that quadrant with the shortest possible Euclidean length. If there is no such test point ($x_j$, $y_j$) or if the shortest Euclidean length is more than some fixed bound (e.g., one-sixth the diameter of the set of test points), then do not create the connecting line. Otherwise, the test point ($x_j$, $y_j$) is referred to as a quadrant-restricted nearest neighbor of the test point ($x_i$, $y_i$).

Note that this algorithm could produce a graph with vertices of degree >4 because ($x_i$, $y_i$) could be a quadrant-restricted nearest neighbor for some test point ($x_j$, $y_j$) that is not one of the quadrant-restricted nearest neighbors for ($x_i$, $y_i$). If a sparser graph is desired, one could first put in only the edges where the quadrant-restricted nearest neighbor relation is symmetric, then add the other edges one at a time in order of increasing length subject to the constraint that no vertex may have degree >4.

A simple brute-force search may be used to find all quadrant-restricted nearest neighbors among a set of test points in quadratic time. If this is too slow, a sweep-line algorithm could provide a better time bound.

2.3 Simplifying the Graph

It is possible that a given set of actual road map data may have so many vertices and edges that it would be impractical to use such a mesh to optimize coverage fraction or other network parameters. There are many ways to simplify a graph. One possibility is to collapse the shortest edge in the mesh and to repeat this collapsing process as often as necessary with the revised mesh. When collapsing an edge, its weight should be distributed to nearby edges, preferably the edges incident on the vertex created by collapsing the edge. Additional details on simplifying a mesh by collapsing edges can be found in, e.g., Hughes Hoppe, "View-dependent refinement of progressive meshes," in Computer Graphics Proceedings, pp. 189–198, 1997, and H. Hoppe, "Progressive simplicial complexes," in Computer Graphics Proceedings, pp. 217–224, 1997.

2.4 Adjusting Edge Weights to Fit Traffic Statistics

Before the above-described graph can be used as a traffic pattern for optimizing network parameters, the edge weights should be adjusted to agree with all available traffic data. For example, there may be network statistics available that give traffic per base station sector. In this case, a propagation prediction model can be used to decide which edges or fractions thereof are assigned to each sector based on the standard requirement, e.g., best signal-to-interference, and the edge weights can then be readjusted to agree with the traffic statistic for that sector.

By way of example, assume that there is an edge of weight $w_{ij}$ between test points i and j, where these test points are in the coverage areas of sectors $a_i$ and $a_j$, respectively. Treating the traffic as distributed along the connecting edges requires that there be some fractions $f_{ij}$ of the edge that is treated as part of sector $a_i$'s coverage area. Hence this edge contributes $f_{ij}w_{ij}$ to sector $a_i$'s edge weight and $(1-f_{ij})w_{ij}$ to sector $a_j$'s edge weight. After adding up all such edge weights, one can compute a multiplier $\omega_a$ for each sector a by which its edge weights must be multiplied in order to agree with the sector's traffic statistic. The effect on an edge weight such as $w_{ij}$ is to multiply it by $$f_{ij}\omega_{a_i}+(1-f_{ij})\omega_{a_j}.$$

3. Defining RF Link Metrics on a Mesh

The mesh on which RF link metrics are defined in accordance with the invention is a graph whose edge weights represent traffic and whose vertices are the test points for which path loss data is available from measurements or from a propagation model. This generally requires a set of interpolation rules for deciding what happens along an edge, given path loss data for the vertices at either end of the edge. The rules are preferably configured such that it is easy to decide how much of the edge to assign to each sector based on the standard requirement, e.g., signal-to-interference ratio, and that this be a reasonably-smooth function of parameters such as antenna tilts and power levels.

3.1 Interpolation Rules for Signal-to-Interference Ratio

The signal-to-interference ratio (1) at vertex i may be rewritten as $$\max_{1 \leq k \leq n} (Sn_{ik})$$

where the k at which the maximum occurs gives the sector to which vertex i is assigned and $Sn_{ik}$ is the signal-to-interference ratio for receiving sector k at vertex i:

$$Sn_{ik} = \frac{Etot_{ik}}{s_i - \alpha_k Etot_{ik}} \text{ where } s_i = fm_i\eta + \sum_{j=1}^{n} \beta_j Etot_{ij}. \qquad (2)$$

Consider an edge between vertices i and j, both of which are assigned to sector k. This means that $Sn_{ik} \geq Sn_{il}$ for any other sector l, and $Sn_{jk}$ is similarly maximal at vertex j. A simple rule for deciding what fraction of the edge is covered is to treat the signal-to-interference for sector k as varying linearly between $Sn_{ik}$ and $Sn_{jk}$. For example, if $Sn_{ik} \geq Y_0$ and $Sn_{jk} \leq Y_0$, then $$\frac{Sn_{ik} - Y_0}{Sn_{ik} - Sn_{jk}} \qquad (3)$$

of the edge is covered above the signal-to-interference threshold $Y_0$.

If vertices i and j are assigned to different sectors k and l, questions such as how much of edge ij is covered involve two different signal-to-interference ratios. For consistency with the same-sector interpolation rule given above, let $$Sn_{ijk}(t)=(1-t)Sn_{ik}+tSn_{jk}$$

$$Sn_{ijl}(t)=(1-t)Sn_{il}+tSn_{jl} \qquad (4)$$

This makes it possible to compute what fraction of the edge is assigned to sector k, what fraction is assigned to sector l, and what fraction is uncovered due to signal-to-interference below the $Y_0$ threshold.

Figure 3:
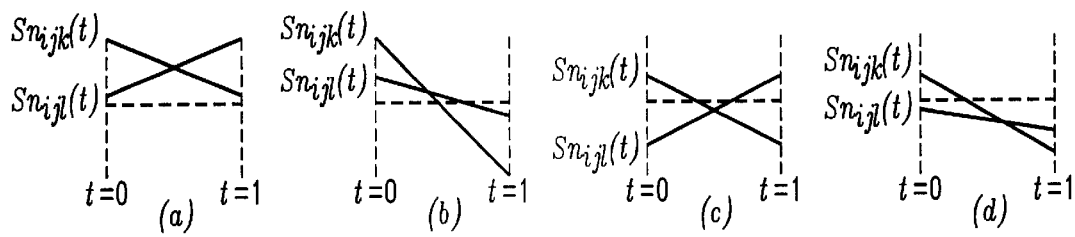
FIGS. 3(a) through 3(d) are plots of signal-to-interference ratio for different two-sector coverage arrangements.

FIGS. 3(a) through 3(d) show plots of $Sn_{ijk}(t)$ and $Sn_{ijl}(t)$ as a function of the fraction t of the way along the edge ij from vertex i to vertex j, for different types of coverage. The dashed line in each plot is the signal-to-interference threshold $Y_0$. FIG. 3(a) shows a case in which edge ij is entirely covered by two sectors, FIG. 3(b) shows a case in which one end of edge ij is covered by two sectors, FIG. 3(c) shows a case in which two sectors cover all but a central portion of edge ij, and FIG. 3(d) shows a case in which one end of edge ij is covered by a single sector.

Figure 4:
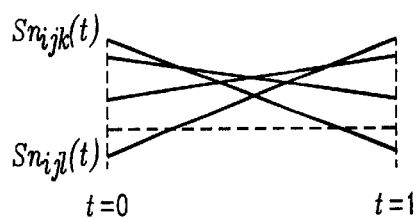
FIG. 4 is a plot of signal-to-interference ratio for a four-sector coverage arrangement.

FIG. 4 illustrates an example of a more extreme case in which linearly interpolating signal-to-interference ratio along edge ij results in portions of the edge being assigned to four different sectors. The figure shows plots of $Sn_{ija}(t)$ for four different sectors a, as a function of the fraction t of the way along the edge ij from vertex i to vertex j, for different types of coverage. The dashed line in each plot is the signal-to-interference threshold $Y_0$. In practice, one may avoid this type of complication by ignoring sectors to which neither endpoint of the edge has been assigned and just using the highest of the signal-to-interference ratios in (4). The cost is that such "cheating" can make it hard to guarantee that performance measures such as coverage are continuous functions of network tuning parameters such as the antenna tilts.

3.2 Smoothness and Derivatives

The purpose of the above-described interpolation rules is to provide an approximation of actual conditions while ensuring that network performance measures such as coverage do not exhibit discontinuities that make them hard to optimize. Some discontinuities may be tolerable if they require unlikely coincidences and an optimization algorithm is not likely to "home in" on them, but it is nonetheless preferable to try to avoid discontinuities. If $C_{ij}$ is the fraction of edge ij for which $Sn_{ija}(t) \geq Y_0$ for some sector a, the coverage $$\frac{\sum_{edges\ ij} w_{ij} C_{ij}}{\sum_{edges\ ij} w_{ij}}$$

is clearly a continuous function of the parameters if each $C_{ij}$ is a continuous function of the parameters.

In situations such as those illustrated in FIGS. 3(a) through 3(d), $C_{ij}$ does not exhibit any discontinuities because infinitesimal changes in the parameters produce infinitesimal changes in $Sn_{ma}$ for each test point m and each sector a in $Sn_{ma}$ in turn produce infinitesimal shifts in the $Sn_{ijk}(t)$ and $Sn_{ijl}(t)$ functions.

In such cases, the derivative of Cij with respect to any network parameter may be expressed in terms of the derivatives $Sn'_{ik}$, $Sn'_{il}$, $Sn'_{jk}$, $Sn'_{jl}$, of the signal-to-interference ratios at each vertex. For example, $C_{ij}$ reduces to (3) in the situation of FIG. 3(d), and the derivative is $$\frac{(Sn_{ik} - Sn_{jk})Sn'_{ik} - (Sn'_{ik} - Sn'_{jk})(Sn_{ik} - Y_0)}{(Sn_{ik} - Sn_{jk})^2}. \quad (5)$$

Figure 5:
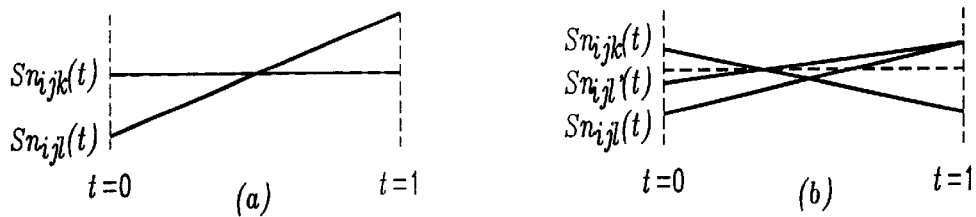
FIGS. 5(a) and 5(b) are plots of signal-to-interference ratio for different two-sector coverage arrangements in which the edge coverage function is potentially discontinuous.

FIGS. 5(a) and 5(b) show plots of $Sn_{ijk}(t)$ and $Sn_{ijl}(t)$ as a function of the fraction t in situations where $C_{ij}$ is potentially discontinuous. Again, for each plot, the dashed line gives the threshold $Y_0$. A potential problem illustrated in the plot of FIG. 5(a) is that the denominator in (5) vanishes if $Sn_{ijk}(t)$ remains constant at $Y_0$. From (4), it is apparent that infinitesimal changes in $Sn_{ik}$ or $Sn_{jk}$ could shift the $Sn_{ijk}(t)$ function downward so it falls below $Y_0$ and causes half of the edge to become uncovered, and $C_{ij}$ suddenly drops from 1 to 0.5.

Another potential problem occurs if the interpolation rules are simplified to avoid the complexities of FIG. 4 by only considering the two sectors that are signal-to-interference leaders for the end points of each edge. Referring to FIG. 5(b), if $Sn_{jl'}=Sn_{jl}$ so that $Sn_{ijl'}(1)=Sn_{ijl}(1)$, then infinitesimal changes could determine which of l and l' is the third sector that gets ignored. This leads to a significant discontinuity since ignoring $Sn_{ijl}(t)$ instead of $Sn_{ijl'}(t)$ increases $C_{ij}$ from 67% to 93%.

Although discontinuities due to the situations illustrated in FIGS. 5(a) and 5(b) may not cause problems for certain optimization processes, e.g., the process described in Philip E. Gill, Walter Murray, and Michael A. Saunders, Technical Report NA 97-2, Dept. of Math., UC San Diego, 1997, such discontinues can nonetheless be removed if necessary. For example, in order to eliminate the problem illustrated in FIG. 5(b), just consider all sectors a in the definition of $$Sn_{ij*}(t) = \max_{1 \leq a \leq n} Sn_{ija}(t),$$

the signal-to-interference t of the way along edge ij. Eliminating the problem illustrated in FIG. 5(b) generally requires a soft threshold:

$$C_{ij} = \int_0^1 \text{Cov}((Sn_{ij*}(t))\,dt,$$

where Cov(s) may be any smooth function that is 0 for ($s<<Y_0$) and 1 for ($s>>Y_0$). These conditions make each $C_{ij}$ a continuous, piecewise-differentiable function of the network parameters.

3.3 Interpolation Rules for Other RF link Metrics

Interpolation rules for RF link metrics other than signal-to-interference ratio will now be described. It is generally not safe to interpolate all metrics linearly since this would be likely to violate mathematical relationships among the RF link metrics, such as the rule for computing signal-to-interference from the path losses. However, since other RF link metrics can readily be computed from received power levels, and the received power levels have a particularly strong dependence on distance from the base station, these received power levels can be interpolated in a manner consistent with the interpolated signal-to-interference, as will be described below.

Using the linear interpolation function $Sn_{ija}(t)$ for all n sectors a gives a complete set of signal-to-interference ratios from which the received powers could in principle be computed. However, since this would typically involve excessive computation and might sometimes fail to yield a reasonable answer, it is preferable to utilize a simpler approach.

The basis for this simplification is that only a small number of $Sn_{ija}(t)$ functions are typically required in order to define the signal-to-interference as a function of the fraction t of the path along an edge ij, and these a values are the only sectors for which received power estimates are likely to be needed. Since there are n received powers to choose and only a few (typically <<n) sectors whose signal-to-interference are assumed to match the $Sn_{ija}(t)$ functions, one can make a further assumption so as to allow an equation based on (2) to be solved for the received power.

Generalizing (2) to hold at some fraction t of the path along the edge from Vertex i to Vertex j gives $$Sn_{ijk}(t) = \frac{E_{ijk}(t)}{s_{ij}(t) - \alpha_a E_{ijk}(t)}, \quad (6)$$

where $s_{ij}(t)$ is an interpolation function that satisfies $s_{ij}(0)\ s_i$ and $s_{ij}(1)=s_j$, and $E_{ijk}(t)$ is a function to be determined giving the power received from antenna k. The above-noted "further assumption" is that $s_{ij}(t)$ interpolates linearly:

$$s_{ij}(t)=(1-t)s_i+ts_j. \quad (7)$$

This allows (6) to be solved for $E_{ijk}(t)$, giving $$E_{ijk}(t) = \frac{Sn_{ijk}(t)s_{ij}(t)}{1 + \alpha_k Sn_{ijk}(t)} \quad (8)$$

where $s_{ij}(t)$ is as in (7) and $Sn_{ijk}(t)$ is as in (4).

4. Sample Results

Figure 6:
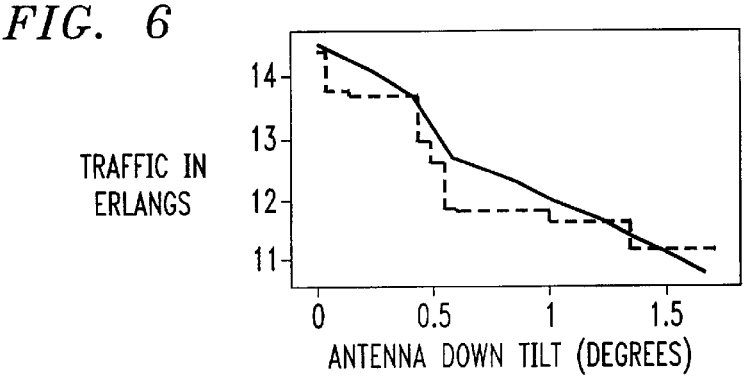
FIG. 6 plots traffic as a function of antenna down tilt for a particular antenna sector in an exemplary implementation of the invention.
Figure 7:
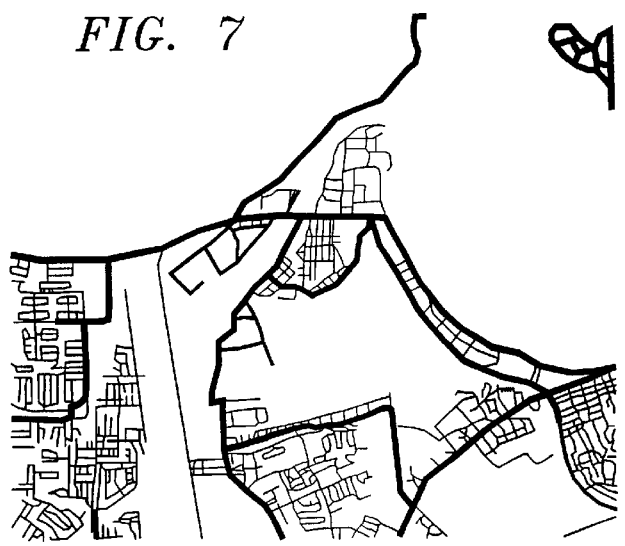
FIGS. 7 and 8 show exemplary unsimplified and simplified edge-weighted traffic distribution graphs, respectively, for use in a road-based evaluation and/or interpolation process in accordance with the invention.
Figure 8:
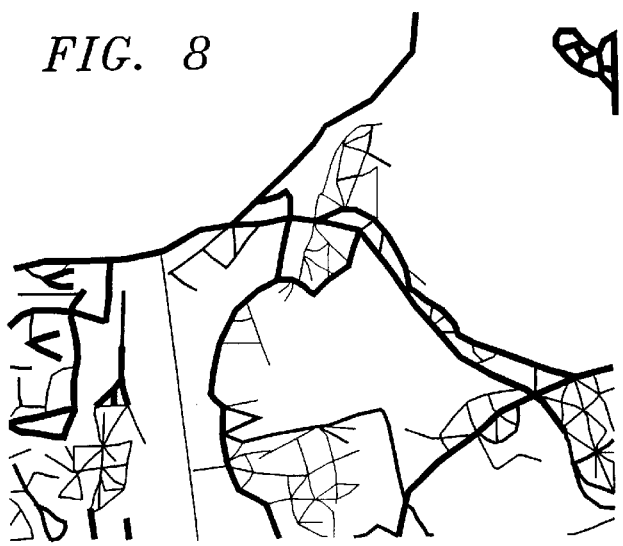

FIG. 6 shows a plot of total edge weight in Erlangs as a function of antenna down tilt for a covered area assigned to a particular one of three cell sectors, using a set of example road data from the above-noted Tiger database. The set of road data used in this example was for San Juan, Puerto Rico, with edge weights based on road type and per-sector traffic statistics. FIG. 7 shows a portion of an unsimplified traffic distribution graph for a portion of the San Juan area. The line widths in the graph are based on edge weight per unit length. The traffic distribution graph for the entire San Juan area had 45,358 vertices and 54,875 edges. Simplifying by collapsing edges as outlined in Section 2.3 above reduced this to 9071 vertices and 12241 edges, while still providing a reasonable amount of detail for each of a total of 169 sectors. FIG. 8 shows a portion of the resulting simplified traffic distribution graph corresponding to the unsimplified graph of FIG. 7. The traffic distribution graphs of FIGS. 7 and 8 are examples of "meshes" that may be used in a road-based evaluation and/or interpolation process in accordance with the invention.

The plot in FIG. 6 illustrates the manner in which the total edge weight covered by the particular sector depends on the down tilt of its antenna. It clearly shows that the edge-based interpolation techniques of Section 3 make the coverage for this sector a much smoother function of its down tilt. Since the overall coverage fraction is a constant times a sum of such functions, it will exhibit the same type of behavior except for some tendency smooth out the discontinuities. This applies to the discontinuities in the dashed curve and the slope discontinuities in the solid curve, but the effect is fairly small because readjusting an antenna tilt only has a significant effect on the coverage for a few nearby sectors.

5. Conclusion

The present invention utilizes road location data, e.g., road map data, to evaluate and/or interpolate network parameters for a wireless network. Advantageously, such road location data can be used to determine an accurate estimate of an actual traffic distribution in a wireless network. Road-map based traffic distributions in accordance with the invention can be readily adjusted to fit observations of traffic per antenna in the actual network, and require far fewer test points than a conventional approach such as sampling on a uniform grid. The road-based interpolation approach of the present invention also provides interpolation rules that result in less-noisy measures of network performance that are much more amenable to automatic optimization algorithms.

It should be noted that the present invention may be implemented at least in part in the form of one or more software programs, e.g., software program instructions executed by processor 12 of system 10. An appropriately-configured software program in accordance with the invention may, e.g., obtain network parameters and road location data from one or more sources, process the network parameter data in accordance with the above-described road-based interpolation process of the invention, and generate a display or other suitable output which presents the resulting network configuration information in a desired format.

The above-described embodiments of the invention are intended to be illustrative only. For example, the above-described techniques can be used to design a wireless network, or to optimize or otherwise improve an existing network that is already under operation. In addition, the invention can be applied to sub-networks, e.g., to designated portions of a given wireless network, and to many different types of networks, e.g., networks with mobile subscriber units or fixed subscriber units or combinations of mobile and fixed units. These and numerous other alternative embodiments within the scope of the appended claims will be readily apparent to those skilled in the art.

What is claimed is:

1. A processor-implemented method for characterizing the performance of a wireless network, the method comprising the steps of:

determining values of at least link parameter of the wireless network over a set of data points derived at least in part from road location data over at least a portion of an area serviced by the wireless network, the values comprising elements of an edge-weight traffic distribution graph; and utilizing the determined values to generate a network performance measure;

wherein the network performance measure comprises a differentiatable function of the at least one link parameter, so as to thereby facilitate derivative-based optimization of the network performance measure.

2. The method of claim 1 wherein the step of determining values comprises utilizing a link model to determine the values.

3. The method of claim 1 wherein the road location data is derived from road map data.

4. The method of claim 1 wherein the road location data is derived from one or more image files.

5. The method of claim 4 wherein the road location data are derived from the image file by first generating a skeleton graph and subsequently applying a polygonal approximation to the skeleton graph.

6. The method of claim 1 wherein a value of at least one link parameter of the wireless network is evaluated on a mesh comprised of at least a subset of the data points and a plurality of corresponding interconnecting edges.

7. The method of claim 6 wherein a value of at least one link parameter of the wireless network is evaluated by interpolating along one or more of the edges.

8. The method of claim 6 wherein each of at least a subset of the edges corresponds at least in part to one or more roads.

9. The method of claim 6 wherein associated with the edges of the mesh are a plurality of edge weights.

10. The method of claim 9 wherein at least a subset of the edge weights represent traffic in the wireless network.

11. The method of claim 9 wherein at least a subset of the edge weights are adjusted so as to be in agreement with available network traffic data.

12. The method of claim 6 wherein the mesh comprises an irregular mesh generated by applying at least one simplifying operation to a finer mesh generated from the road location data.

13. The method of claim 12 wherein the simplifying operation comprises an edge collapsing operation.

14. The method of claim 7 wherein the interpolating step permits the network performance measure to be computed as a smooth function of the at least one link parameter.

15. The method of claim 1 wherein the link parameter comprises a signal strength.

16. The method of claim 1 wherein the link parameter comprises a signal-to-interference ratio.

17. The method of claim 1 wherein the link parameter comprises a path loss.

18. The method of claim 1 wherein the link parameter is used to generate a measure of network performance.

19. The method of claim 18 wherein the network performance measure comprises a network coverage measure.

20. The method of claim 18 wherein the network performance measure comprises a network capacity measure.

21. The method of claim 18 wherein the network performance measure is generated at least in part using values interpolated along edges in a mesh of data points.

22. The method of claim 18 wherein the network performance measure is at least in part a differentiable function of a network parameter.

23. The method of claim 22 wherein the network performance measure is differentiated with respect to a network parameter along edges in a mesh including at least a subset of the data points.

24. The method of claim 22 wherein the network performance measure is optimized with respect to the network parameter using a derivative-based algorithm.

25. The method of claim 19 wherein the network coverage measure comprises a fraction of a target coverage area having at least one link parameter above a specified threshold.

26. An apparatus for characterizing the performance of a wireless network, the apparatus comprising:

a processor-based system comprising a processor coupled to a memory and operative to determine values of at least one link parameter of the wireless network over a set of data points derived at least in part from road location data over at least a portion of an area serviced by the wireless network, the values comprising elements of an edge-weighted traffic distribution graph, and to utilize the determined values to generate a network performance measure;

wherein the network performance measure comprises a differentiable function of the at least one link parameter, so as to thereby facilitate derivative-based optimization of the network performance measure.

27. An article of manufacture comprising a computer-readable medium storing one or more software programs for use in characterizing the performance of a wireless network, wherein the one or more programs when executed by a processor perform the steps of:

determining values of at least one link parameter of the wireless network over a set of data points derived at least in part from road location data over at least a portion of an area serviced by the wireless network, the values comprising elements of an edge-weighted traffic distribution graph; and utilizing the determined values to generate a network performance measure;

wherein the network performance measure comprises a differentiable function of the at least one link parameter, so as to thereby facilitate derivative-based optimization of the network performance measure.

28. A processor-implemented method for characterizing the performance of a wireless network, the method comprising the steps of:

interpolating values of at least one link parameter of the wireless network along a plurality of edges interconnecting data points derived at least in part from location data characterizing at least a portion of an area serviced by the wireless network, the values comprising elements of an edge-weighted traffic distribution graph; and generating a measure of network performance based at least in part on the interpolated values;

wherein the network performance measure comprises a differentiable function of the at least one link parameter, so as to thereby facilitate derivative-based optimization of the network performance measure.

29. An apparatus for characterizing the performance of a wireless network, the apparatus comprising:

a processor-based system operative (i) to interpolate values of at least one link parameter of the wireless network along a plurality of edges interconnecting data points derived at least in part from location data characterizing at least a portion of an area serviced by the wireless network, the values comprising elements of an edge-weighted traffic distribution graph, and (ii) to generate a measure of network performance based at least in part on the interpolated values;

wherein the network performance measure comprises a differentiable function of the at least one link parameter, so as to thereby facilitate derivative-based optimization of the network performance measure.

30. An article of manufacture comprising a computer-readable medium storing one or more software programs for use in characterizing the performance of a wireless network, wherein the one or more programs when executed by a processor perform the steps of:

interpolating values of at least one link parameter of the wireless network along a plurality of edges interconnecting data points derived at least in part from map data characterizing at least a portion of an area serviced by the wireless network, the values comprising elements of an edge-weighted traffic distribution graph; and generating a measure of network performance based at least in part on the interpolated values;

wherein the network performance measure comprises a differentiable function of the at least one link parameter, so as to thereby facilitate derivative-based optimization of the network performance measure.

* * * * *